US011346436B2

(12) United States Patent
Arnault et al.

(10) Patent No.: US 11,346,436 B2
(45) Date of Patent: May 31, 2022

(54) PULLEY DEVICE, IN PARTICULAR FOR TENSIONING IDLER OR RUNNER ROLLER

(71) Applicant: AKTIEBOLAGET SKF, Gothenburg (SE)

(72) Inventors: Benoit Arnault, Saint-Cyr-sur-Loire (FR); Mickael Chollet, Joué-lès-Tours (FR); Kévin Lefort, Donges (FR); Simon Prevost, Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 184 days.

(21) Appl. No.: 16/752,909

(22) Filed: Jan. 27, 2020

(65) Prior Publication Data

US 2020/0263777 A1 Aug. 20, 2020

(30) Foreign Application Priority Data

Feb. 18, 2019 (DE) .......................... 102019202146.8

(51) Int. Cl.
*F16H 55/46* (2006.01)
*F16H 7/18* (2006.01)
(Continued)

(52) U.S. Cl.
CPC ........... *F16H 55/46* (2013.01); *F16H 7/1254* (2013.01); *F16H 7/18* (2013.01); *F16H 55/36* (2013.01);
(Continued)

(58) Field of Classification Search
CPC .......... F16H 55/36; F16H 55/42; F16H 55/44; F16H 55/46; F16H 55/48; F16H 55/52; F16H 55/56; F16H 55/566; F16H 7/12; F16H 7/14; F16H 7/16; F16H 7/18; F16H 7/1254; F16H 2007/185; F16H 2007/0865
(Continued)

(56) References Cited

U.S. PATENT DOCUMENTS 859,099 A * 7/1907 Nice, Jr. ........................ 474/199
1,606,175 A * 11/1926 Olinger ................... F16H 55/50
474/183
(Continued)

FOREIGN PATENT DOCUMENTS

DE 202005011230 U1 9/2005
GB 190509598 A 5/1906
(Continued)

*Primary Examiner* — Michael R Mansen
*Assistant Examiner* — Raveen J Dias
(74) *Attorney, Agent, or Firm* — J-TEK Law PLLC; Scott T. Wakeman; Mark A. Ussai

(57) ABSTRACT

A pulley device configured to support a belt of a chain tensioning idler or runner roller includes a bearing having a rotatable outer ring and a coaxial fixed inner ring and a pulley having at least one C-shaped pulley part that has an inner portion with an inner surface mounted on an outer cylindrical surface of the bearing outer ring, an outer cylindrical portion having an outer cylindrical surface configured to contact the belt or the chain, and a radial intermediate portion between axial outer ends of the inner and outer cylindrical portions and an axial outer end of the outer cylindrical portion, wherein the intermediate portion in cross section has a shape of an arc circle.

11 Claims, 2 Drawing Sheets

(51) Int. Cl.
  *F16H 7/12* (2006.01)
  *F16H 55/44* (2006.01)
  *F16H 7/08* (2006.01)
  *F16H 55/36* (2006.01)
(52) U.S. Cl.
  CPC ..... *F16H 55/44* (2013.01); *F16H 2007/0865* (2013.01)
(58) Field of Classification Search
  USPC .................................................. 474/198, 199
  See application file for complete search history.

(56) References Cited

U.S. PATENT DOCUMENTS

| | | | | | |
|---|---|---|---|---|---|
| 3,490,285 | A | * | 1/1970 | Donath | F16H 7/12 474/187 |
| 3,633,431 | A | * | 1/1972 | Van Bussel | F16H 55/44 474/168 |
| 3,771,843 | A | * | 11/1973 | Clasper | B62D 55/14 474/187 |
| 3,822,457 | A | * | 7/1974 | Frost | F16H 55/44 29/892.11 |
| 3,842,475 | A | * | 10/1974 | Clasper | B21D 53/26 29/892.11 |
| 3,915,511 | A | * | 10/1975 | Clasper | B60B 3/08 474/187 |
| 3,926,485 | A | * | 12/1975 | Frost | F16C 33/7886 384/510 |
| 4,443,210 | A | * | 4/1984 | Olschewski | F16H 7/1281 474/112 |
| 4,457,740 | A | * | 7/1984 | Olschewski | F16C 13/006 474/112 |
| 4,468,210 | A | * | 8/1984 | McCutchan, Jr. | F16H 55/44 474/170 |
| 4,571,226 | A | * | 2/1986 | Molloy | F16H 7/12 474/190 |
| 4,591,352 | A | * | 5/1986 | Olschewski | F16C 13/006 384/505 |
| 4,602,875 | A | * | 7/1986 | Doerr | F16H 55/48 384/547 |
| 4,799,909 | A | * | 1/1989 | Kanemitsu | B21D 53/261 474/168 |
| 4,822,111 | A | * | 4/1989 | Albert | B60B 3/002 301/105.1 |
| 4,831,705 | A | * | 5/1989 | Kanemitsu | B21D 53/261 29/892.11 |
| 5,725,448 | A | * | 3/1998 | Kato | F16C 13/006 384/510 |
| 5,823,904 | A | * | 10/1998 | Hodjat | F16H 55/44 474/170 |
| 5,931,755 | A | * | 8/1999 | Mailey | B29C 45/27 474/161 |
| 6,270,001 | B1 | * | 8/2001 | Tadic | B23K 31/02 228/245 |
| 2001/0016529 | A1 | * | 8/2001 | Kawachi | F16H 55/36 474/94 |
| 2003/0008741 | A1 | * | 1/2003 | Fadler | F16H 55/44 474/174 |
| 2003/0008743 | A1 | * | 1/2003 | Cadarette | F16H 55/36 474/199 |
| 2004/0178398 | A1 | * | 9/2004 | Miller | F16H 55/44 254/390 |
| 2004/0235599 | A1 | * | 11/2004 | Ozorak | F16C 25/08 474/199 |
| 2004/0264824 | A1 | * | 12/2004 | Iwata | F16C 33/7853 384/484 |
| 2006/0084541 | A1 | * | 4/2006 | Nosaka | F16D 7/048 474/170 |
| 2006/0089201 | A1 | * | 4/2006 | Nosaka | F16D 9/08 464/30 |
| 2006/0142102 | A1 | * | 6/2006 | Radocaj | F16H 55/36 474/199 |
| 2008/0287236 | A1 | * | 11/2008 | Yamaguchi | F16H 55/36 474/170 |
| 2008/0300077 | A1 | * | 12/2008 | Kapfer | F16C 13/006 474/133 |
| 2009/0145261 | A1 | * | 6/2009 | Obeshaw | F16F 15/1442 74/574.4 |
| 2009/0191999 | A1 | * | 7/2009 | Joseph | F16H 55/36 474/199 |
| 2009/0298630 | A1 | * | 12/2009 | Mineno | F16C 35/063 474/199 |
| 2011/0039648 | A1 | * | 2/2011 | Lannutti | F16C 13/006 474/166 |
| 2011/0111900 | A1 | * | 5/2011 | Wilson | F16H 7/20 474/166 |
| 2014/0031157 | A1 | * | 1/2014 | Takano | F16C 35/063 474/135 |
| 2016/0017978 | A1 | * | 1/2016 | Koda | F16H 55/44 474/166 |
| 2016/0245389 | A1 | * | 8/2016 | Albrecht | F16H 55/36 |
| 2017/0023119 | A1 | * | 1/2017 | Lannutti | F16C 35/067 |
| 2018/0023679 | A1 | * | 1/2018 | Basile | F16C 35/067 474/166 |
| 2019/0186612 | A1 | * | 6/2019 | Arnault | F16H 7/12 |
| 2019/0323594 | A1 | * | 10/2019 | Arnault | F16C 19/18 |
| 2019/0390756 | A1 | * | 12/2019 | Arnault | F16H 57/0031 |
| 2020/0088274 | A1 | * | 3/2020 | Arnault | F16C 33/783 |
| 2020/0200221 | A1 | * | 6/2020 | Inoue | F16C 33/78 |
| 2020/0256378 | A1 | * | 8/2020 | Hauvespre | F16H 7/20 |
| 2020/0256447 | A1 | * | 8/2020 | Arnault | F16C 19/08 |
| 2020/0256448 | A1 | * | 8/2020 | Chollet | F16H 55/46 |
| 2020/0256449 | A1 | * | 8/2020 | Hauvespre | F16C 33/586 |
| 2020/0263766 | A1 | * | 8/2020 | Arnault | F16H 55/44 |
| 2020/0263776 | A1 | * | 8/2020 | Arnault | F16H 7/1254 |
| 2020/0386304 | A1 | * | 12/2020 | Arnault | F16H 55/36 |
| 2020/0393032 | A1 | * | 12/2020 | Kerin | F16H 55/48 |

FOREIGN PATENT DOCUMENTS

| | | | |
|---|---|---|---|
| GB | 141829 A | 4/1920 | |
| WO | WO-2006092187 A1 * | 9/2006 | ............ F16C 13/006 |
| WO | WO-2007101771 A1 * | 9/2007 | ............ F16H 55/44 |
| WO | WO-2011098125 A1 * | 8/2011 | ............ F16H 55/44 |

* cited by examiner

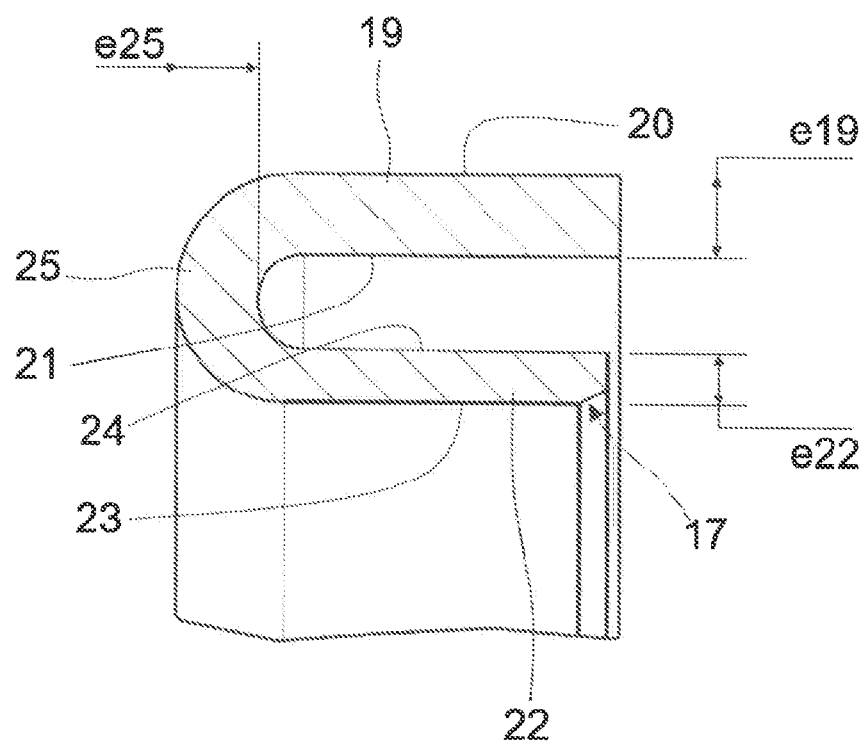

PULLEY DEVICE, IN PARTICULAR FOR TENSIONING IDLER OR RUNNER ROLLER

CROSS-REFERENCE

This application claims priority to German patent application no. 10 2019 202 146.8 filed on Feb. 18, 2019, the contents of which are fully incorporated herein by reference.

TECHNICAL FIELD

The present disclosure is directed to the field of pulley devices for tensioning idlers or runner rollers designed to interact with a chain or a belt, for example a distribution belt of an internal combustion engine of a vehicle.

BACKGROUND

Such rollers are usually used to keep a tension on the belt or chain constant or in a determined range or to locally modify the path taken by the chain or belt. These are called respectively tensioning idlers or runner rollers. In runner rollers, the pulley is mounted so as to rotate on a screw or a spindle by means of a rolling bearing, the roller then being attached directly or indirectly to the engine block or to an element of a tensioning idler device, for example an articulated arm or an eccentric.

Document GB 190509598 discloses a pulley comprising male and female overlapping parts which are in interlocking relation and form a cylindrical outer portion intended to be in contact with a belt.

A major disadvantage of this pulley is that an annular recess is formed on the outer portion adapted to support the belt when the male and female parts are fastened together. There is therefore a risk of an early wear of the belt.

It is also known by document GB 141 829 a pulley comprising a peripheral part intended to be in contact with a belt, an inner part and a intermediate part between the inner and outer parts. The pulley is tightened to the outer ring of bearing, but said pulley can slightly axially move during the service use of the pulley device. Moreover, with a pulley such as disclosed, the outer part may be deformed radially inwards by bending under the action of the belt.

It has been proposed in document DE 202005011230 U1 to house a damping element such as a damping ring within a C-shaped pulley, said damping element being dedicated to damp vibrations from the belt and being suitable to limit radial inward deformation of outer portion of said pulley. However, the pulley can still be deformed under heavy loads.

SUMMARY

An aspect of the disclosure is to overcome these drawbacks by providing a pulley which is easy to install onto a bearing, of good rigidity, adapted to avoid an early wear of the belt, and permitting an efficient support of said belt.

To this end, the disclosure relates to a pulley device suitable for a belt of chain tensioning idler or runner roller, comprising a bearing and a pulley.

The bearing comprises a rotatable outer ring and a fixed inner ring, said rings being coaxial.

The pulley comprises at least one pulley part having in cross section an overall shape of a C, and having an inner portion with an inner surface mounted on an outer cylindrical surface of outer ring of bearing, an outer cylindrical portion having an outer cylindrical surface intended to be in contact with the belt or the chain, and a radial intermediate portion extending substantially radially between axial ends of inner and outer portions on one axial side of pulley device, the pulley part being formed integral and defining an open end on one axial side opposite to the intermediate portion.

According to the disclosure, the intermediate portion has in cross section an overall shape of an arc circle.

According to further aspects of the disclosure which are advantageous but not compulsory, such a pulley device may incorporate one or several of the following features:

The bearing is a rolling bearing, at least one row of rolling elements being radially interposed between the inner ring and the outer ring.

The rolling elements are balls.

The rolling elements are equally circumferentially spaced and maintained by an annular cage.

The pulley is formed by only one pulley part.

The pulley comprises two C-shaped pulley parts mounted onto the outer cylindrical surface of outer ring of bearing, open ends of said pulley parts axially facing each other, free ends of outer portions of pulley parts being in axial abutment.

The two pulley parts are symmetrical with respect to a transverse radial plane passing through the center of the bearing.

The outer portion of pulley part is of greater axial length than that of the inner portion, said outer portion protruding axially on at least one axial side of the inner portion.

The pulley part is made from a stamped metal sheet or blank.

The ratio between the material thickness of intermediate portion and the material thickness of inner portion of said pulley part is strictly greater than 1.

The ratio between the material thickness of intermediate portion and the material thickness of inner portion of said pulley part is comprised between 1.1 and 1.5, and advantageously equal to 1.25.

The outer cylindrical portion and the intermediate portion of pulley part are of equal thickness.

BRIEF DESCRIPTION OF THE DRAWINGS

The disclosure will now be explained in correspondence with the annexed figures, as illustrative example, without restricting the invention. In the annexed figures:

FIG. 2 is an axial section of one pulley part provided to the pulley device of FIG. 1.

DETAILED DESCRIPTION

Figure 1:
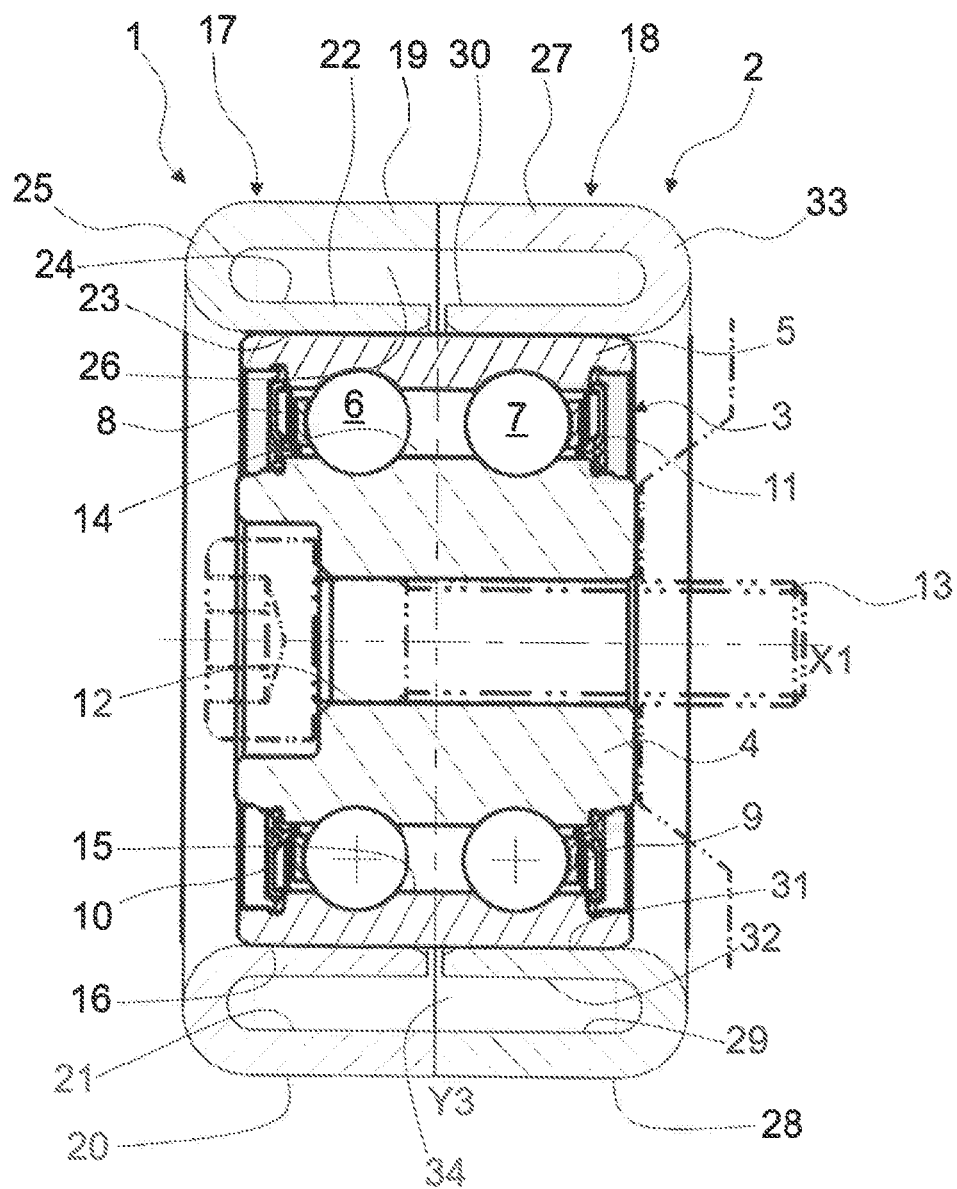
FIG. 1 is an axial section of a pulley device according to a first embodiment of the invention.

The pulley device 1 as illustrated in FIGS. 1 to 3 is suitable for a belt or chain tensioning idler or runner roller, and comprises a pulley 2 adapted to interact with a belt or chain (not shown) and a rolling bearing 3 with a geometric axis X1.

The rolling bearing comprises a fixed inner ring 4 and a rotatable outer ring 5 between which are housed two rows of rolling elements 6 and 7, which in this case are balls, two annular cages 8, 9 respectively maintaining the circumferential spacing of said rolling elements 6, 7, and two annular seals 10, 11.

The inner ring 4 and the outer ring 5 are concentric and symmetric with respect to a transverse radial plane Y3 passing through the center of the rolling bearing 3. The rings 4, 5 are advantageously of solid type. A solid type is to be understood as a ring obtained by machining with removal of material, by machining, grinding, from a metal tube stock, bar stock, rough forgings and/or rolled blanks.

The inner ring 4 comprises a bore 12 configured to receive a fastening screw 13 (in dotted line) to fasten the device 1 on an external support. The inner ring further comprises an outer cylindrical surface 14 onto which toroidal circular raceways are formed, said raceways having in cross section a concave internal profile adapted to the rolling elements 6, 7.

The outer ring 5 comprises a cylindrical bore 15 onto which toroidal circular raceways are formed, said raceways having in cross section a concave internal profile adapted to receive the rolling elements 6, 7. The outer ring 5 further comprises an outer cylindrical surface 16.

The pulley 2 has two pulley parts 17, 18, both having in cross section an overall shape of a C.

The first pulley part 17 comprises an axial annular outer portion 19 providing a cylindrical outer surface 20 designed to interact with a portion of the belt of the chain, and a cylindrical inner surface or bore 21.

The first pulley part 17 also comprises an axial annular inner portion 22 providing an inner surface or bore 23 into which the outer cylindrical surface 16 of outer ring 5 of bearing 3 is mounted, and an outer surface 24.

The outer portion 19 is of larger diameter than that of the inner portion 22, said outer portion 19 radially surrounding the inner portion 22. Advantageously, the outer portion 19 is of greater axial length than that of the inner portion 22, said outer portion 19 protruding axially on at least one axial side of the inner portion 22.

The first pulley part 17 further comprises an annular radial intermediate portion 25 extending substantially radially between axial ends of the inner and outer portions 22, 19 on a first axial side of the pulley device 1.

The first pulley part 17 then has in cross section an overall shape of a C, defining an open end 26 on one axial side of the pulley device 1. The first pulley part 17 is formed integral.

The second pulley part 18 comprises an axial annular outer portion 27 providing a cylindrical outer surface 28 designed to interact with a portion the belt of the chain, and a cylindrical inner surface or bore 29.

The second pulley part 18 also comprises an axial annular inner portion 30 providing an inner surface or bore 31 into which the outer cylindrical surface 16 of outer ring 5 of bearing 3 is mounted, and an outer surface 32.

The outer portion 27 is of larger diameter than that of the inner portion 30, said outer portion 27 radially surrounding the inner portion 30. Advantageously, the outer portion 27 is of greater axial length than that of the inner portion 30, said outer portion 27 protruding axially on at least one axial side of the inner portion 30.

The second pulley part 18 further comprises an annular radial intermediate portion 33 extending substantially radially between axial ends of inner and outer portions 30, 27 on a second axial side of pulley device 1, said second axial side being axially opposite to the first axial side.

The second pulley part 18 then has in cross section an overall shape of a C, defining an open end 34 on one axial side of the pulley device 1. The second pulley part 18 is formed integral.

Advantageously, the pulley parts 17, 18 are both made of thin metal sheet or blank by folding, cutting and stamping.

Advantageously, the two C-shaped pulley parts 17, 18 are symmetrical with each other with respect to the radial plane Y3. The free ends of the outer portions 19, 27 of the first and second pulley parts 17, 18 respectively come into contact in an axial direction, the open ends 26, 34 respectively being axially open to each other. The two outer cylindrical surfaces 20, 28 form a surface configured to interact with the belt or the chain. The pulley 2 formed by the two pulley parts 17, 18 arranged in axial contact with each other is suitable for guiding, supporting the belt of the chain with an efficient manner.

Advantageously, the inner portions 22, 30 of the pulley part 17, 18 are cylindrical, the inner surfaces 23, 31 being cylindrical. Alternatively, the inner portions may be frustoconical, the inner surfaces being frustoconical and inclined towards the outer surface 16 of the outer ring 5. Advantageously, the inner surfaces 23, 31 of inner portions 22, 30 are force fitted (press-fitted onto the outer cylindrical surface 16 of outer ring 5.

According to the disclosure, the intermediate portion 25 of the pulley part 17 connects the outer and inner portions 19, 22 with an overall shape of an arc circle in cross section.

Similarly and symmetrically, the intermediate portion 33 of the pulley part 18 connects the outer and inner portions 27, 30 with an overall shape of an arc circle.

According to an advantageous embodiment, the material thickness e25 of the intermediate portion 25 of pulley part 17 is strictly greater than the material thickness e22 of the inner portion 22.

According to an advantageous embodiment, the intermediate portions 25, of pulley part 17 is of equal thickness with the outer cylindrical portions 19. The material thickness e19 in the radial direction of outer cylindrical portion 19 of pulley part 17 is strictly greater than the material thickness e22 in the radial direction of the inner portion 22.

Advantageously, the ratio between the thicknesses e19 and e22 is between 1.1 and 1.5, and preferably equal to 1.25.

Similarly and symmetrically, the material thickness of the intermediate portion 33 of the pulley part 18 is strictly greater than the material thickness in the radial direction of the inner portion 30.

Advantageously, the pulley parts 17, 18 are symmetric with respect to the radial plane Y3 passing through the center of the bearing 3, and then the outer portions 19, 27 are of equal thickness e19, and the inner portions 22, 30 are also of equal thickness e22.

Because of this configuration, the outer portions 19, 27 are stiffened and then less subject to be deformed when a pulley or a chain exerts a radial load. The pulley parts 17, 18 are then more robust.

Representative, non-limiting examples of the present invention were described above in details with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved pulley device.

Moreover, various features of the above-described representative examples, as well as the various independent and dependent claims below, may be combined in ways that are not specifically and explicitly enumerated in order to provide additional useful embodiments of the present teachings.

What is claimed is:

1. A pulley device configured to support a belt of a chain tensioning idler or runner roller, comprising:
   a bearing having a rotatable outer ring and a coaxial fixed inner ring; and
   a pulley having two C-shaped pulley parts, each of the pulley parts having an inner portion with an inner surface mounted on an outer cylindrical surface of the outer ring, an outer cylindrical portion having an outer cylindrical surface configured to contact the belt, and a radial intermediate portion extending substantially radially between an axial outer end of the inner portion and an axial outer end of the outer cylindrical portion, each of the two pulley parts being formed integral and defining an open end on an axial side opposite the radial intermediate portion;
   wherein the radial intermediate portion in cross section has a shape of an arc circle,
   wherein the open ends of the two pulley parts axially face each other,
   wherein axially inner ends of the inner portions are axially spaced from each other, and
   wherein axially inner ends of the outer cylindrical portions are in axial abutment with each other.

2. The pulley device according to claim 1, wherein the two pulley parts are symmetrical with respect to a transverse radial plane passing through a center of the bearing.

3. The pulley device according to claim 1, wherein the two pulley parts are made from a stamped metal sheet or blank.

4. The pulley device according to claim 1, wherein a ratio between a material thickness of the radial intermediate portion and a material thickness of the inner portion is strictly greater than 1.

5. The pulley device according to claim 4, wherein the ratio between the material thickness of the radial intermediate portion and the material thickness of inner portion is between 1.1 and 1.5.

6. The pulley device according to claim 4, wherein the ratio between the material thickness of the radial intermediate portion and the material thickness of inner portion is equal to 1.25.

7. The pulley device according to claim 4, wherein a material thickness of the outer cylindrical portion is equal to the material thickness of the radial intermediate portion.

8. The pulley device according to claim 1,
   wherein an axially outer surface of the radial intermediate portion lies on an arc of a first circle.

9. The pulley device according to claim 8,
   wherein an axially inner surface of the radial intermediate portion lies on an arc of a second circle.

10. The pulley device according to claim 1,
    wherein the radial intermediate portion has an overall shape of an arc circle.

11. The pulley device according to claim 1,
    wherein a material thickness of the outer cylindrical portion is greater than a material thickness of the inner portion, and
    wherein a material thickness of the radial intermediate portion is greater than the material thickness of the inner portion.

* * * * *